United States Patent [19]

Jamel

[11] 4,235,541
[45] Nov. 25, 1980

[54] PERISCOPE FINDER

[76] Inventor: Billwayne Jamel, 28 Valley View Rd., Elmsford, N.Y. 10523

[21] Appl. No.: 25,037

[22] Filed: Mar. 29, 1979

[51] Int. Cl.³ .................. G03B 17/48; G03B 19/12
[52] U.S. Cl. .................................. 354/79; 354/152
[58] Field of Search .................. 354/79, 81, 152, 43

[56] References Cited

U.S. PATENT DOCUMENTS

| | | | |
|---|---|---|---|
| 1,095,285 | 5/1914 | Oliver | 354/79 |
| 1,486,231 | 3/1924 | Cox | 354/79 X |
| 2,845,842 | 8/1958 | Leitz et al. | 354/79 X |
| 2,933,992 | 4/1960 | Bushnell et al. | 354/79 |
| 4,114,171 | 9/1978 | Altman | 354/152 |
| 4,133,607 | 1/1979 | Mansho | 354/81 |
| 4,137,539 | 1/1979 | Maitani | 354/152 |

FOREIGN PATENT DOCUMENTS

| | | | |
|---|---|---|---|
| 2384272 | 10/1978 | France | 354/43 |
| 1286355 | 8/1972 | United Kingdom | 354/79 |

*Primary Examiner*—Donald A. Griffin

[57] ABSTRACT

A periscope finder readily attached to a camera in place of the camera lens which includes a pair of telescopic tubular members having light reflecting mirrors at their free ends and being detachably joined to the camera lens at their inner ends.

2 Claims, 4 Drawing Figures

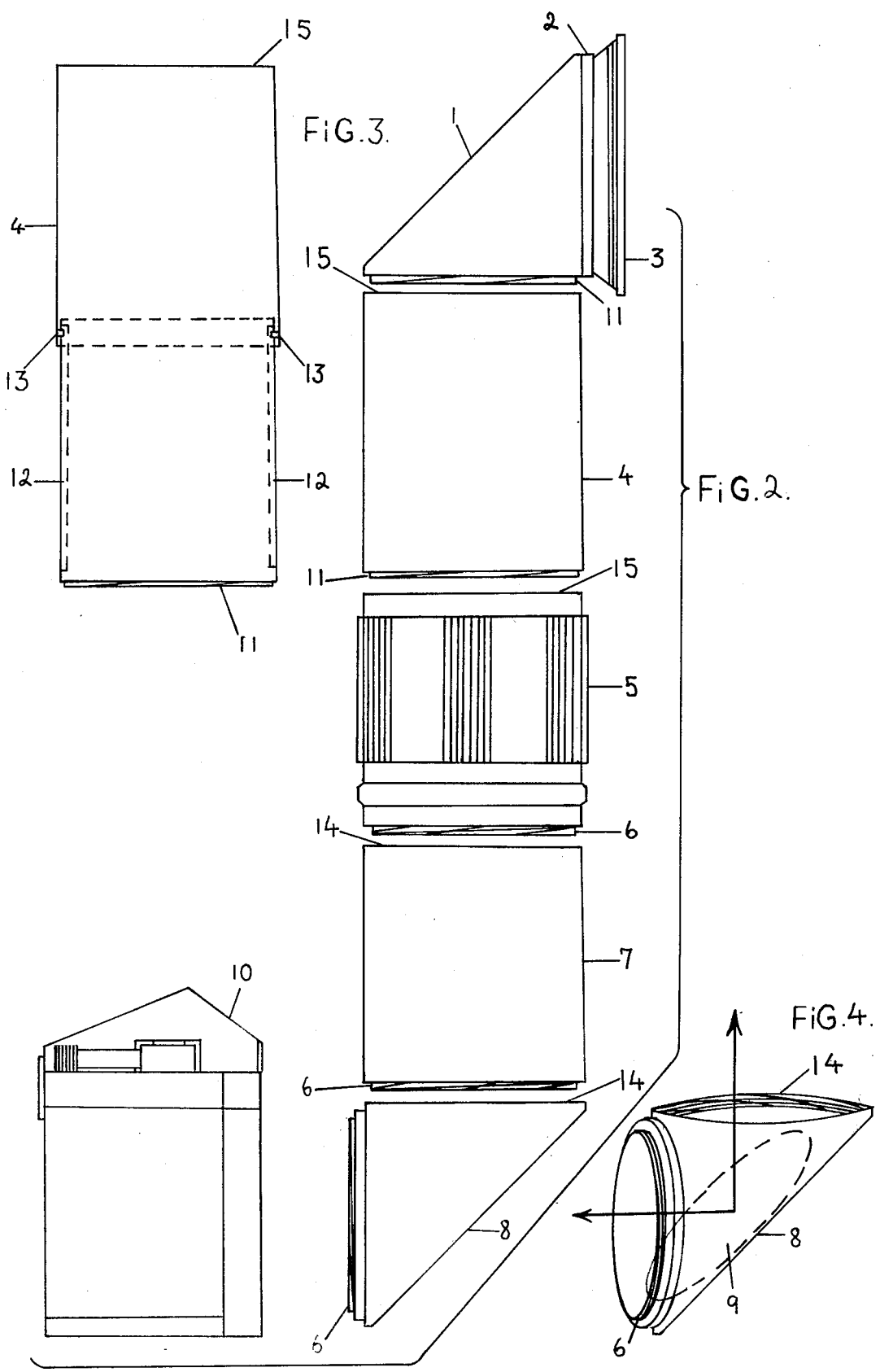

PERISCOPE FINDER

The invention relates to improvements in periscope finders in which a lens from a camera placed in the middle of the periscope finder is still able to be focused. The object of which is to provide a photographer when in a crowd an advantage by which he would still be able to photograph intended subjects.

One form of the invention is illustrated in the accompanying drawings in which

FIG. 2 shows the periscope finder dismantled;

FIG. 3 is a technical view of the upper extender telescoped into extended position and FIG. 4 shows a technical view of the periscope adaptor with arrows indicating the flow of motion.

Figure 1:
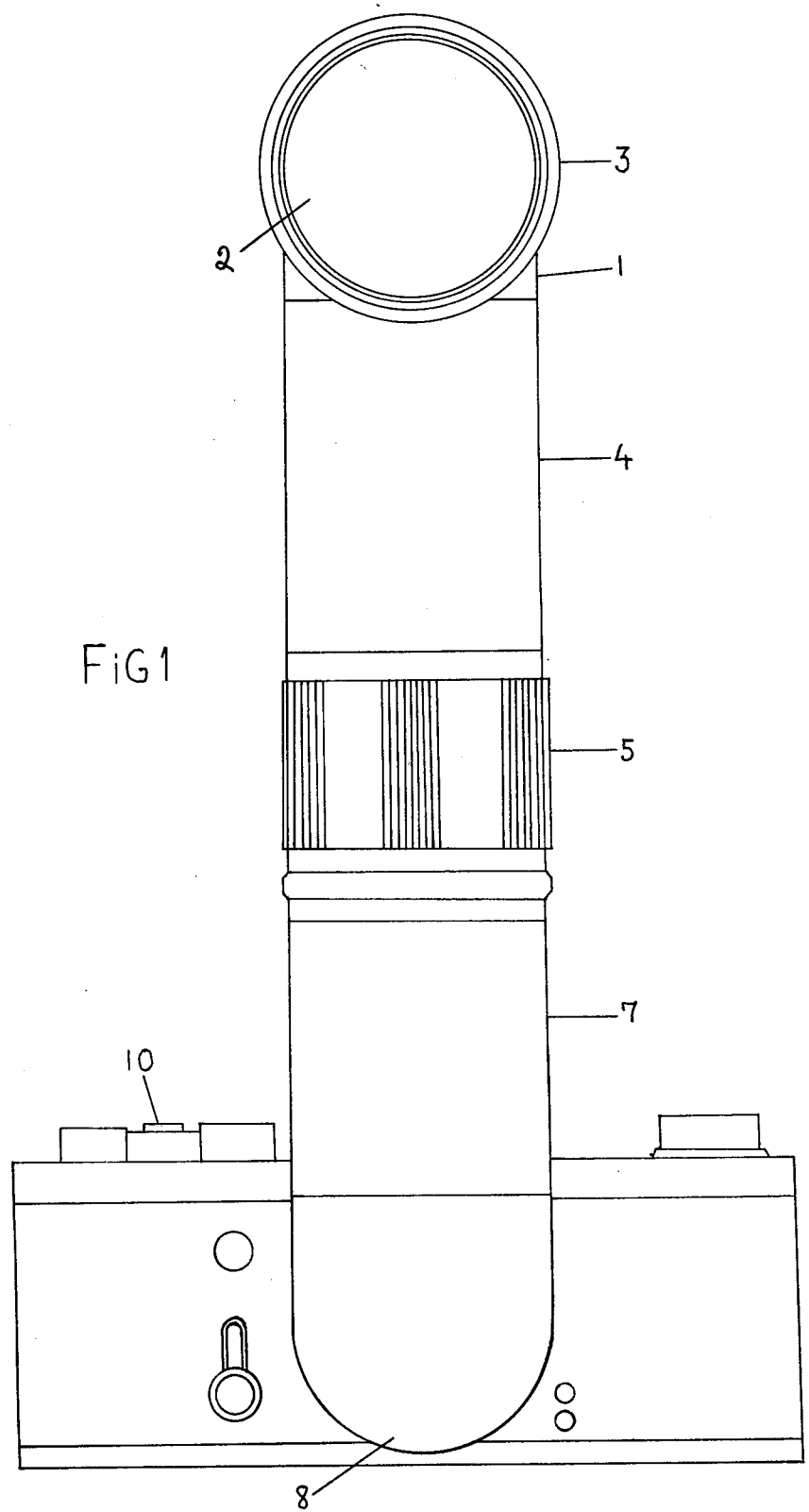
FIG. 1 is a frontal view of the entire periscope finder joined together and attached to the camera.

Periscope adaptor 8, lower extender 7 with the lens 5, upper extender 4 and finder 1 secured together and affixed to camera 10 constitutes the periscope finder. In FIG. 2, finder 1 complete with filter 2 and lens shade 3 receives the image which is in turn bounced off a mirror in the back of finder 1. The image is then transported through upper extender 4. Upper extender 4 and lower extender 7 are both independently collapsable and extendable. FIG. 3 illustrates how buffers 13-13 of the exterior tube of upper extender 4 can slide within grooves 12-12 the purpose of which is to prevent any movement of finder 1. The image after being received by lens 5 then proceeds through lower extender 7 and is reflected off mirror 9 of periscope adaptor 8 as illustrated in FIG. 4. If the eye of the photographer receives an image not in focus through camera 10, he would then take steps to adjust the focus with lens 5.

Periscope finder mounts 6 may be bayonette or universal mounts depending on the type of camera and lens. Periscope finder mounts 11 are threaded to correspond with the top of lens 5. Sockets 14 are made to accommodate periscope finder mounts 6 and are interchangeable. Sockets 15 are made to accommodate periscope finder mounts 11 and are also interchangeable.

I am aware that prior to my invention Periscopes able to be focused have been made. I therefore do not claim such a combination; but,

I claim:

1. A periscope finder for use with a film containing camera of the interchangeable lens mount type to facilitate taking of pictures in a crowd, said periscope finder being of the knockdown type to facilitate carrying of same in a compact condition and comprising a pair of tubular extensions and a pair of light deflecting members each having means thereon to enable the extensions to be removably secured to the camera lens with the said lens therebetween to form an elongated light transmitting tube of considerable length with the light deflecting members secured to the free ends of the said light transmitting tube to form the assembled periscope finder and to enable the thus assembled periscope finder to be detachably secured to the camera lens mount, said camera lens being adapted to be employed to focus the light transmitted through the periscope finder to the camera film.

2. A periscope finder according to claim 1 wherein at least one of said tubular extensions is formed of at least two telescoping elements to enable the length of the extension to be changed.

* * * * *